United States Patent
Iguchi (10) Patent No.: US 8,223,160 B2
(45) Date of Patent: Jul. 17, 2012

(54) IMAGE PROCESSING DEVICE, CONTROL METHOD OF IMAGE PROCESSING DEVICE, AND STORAGE MEDIUM

(75) Inventor: Junji Iguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 11/953,219

(22) Filed: Dec. 10, 2007

(65) Prior Publication Data

US 2008/0136837 A1    Jun. 12, 2008

(30) Foreign Application Priority Data

Dec. 12, 2006 (JP) .................................. 2006-334238

(51) Int. Cl.
   G06T 1/60 (2006.01)
   G09G 1/14 (2006.01)
(52) U.S. Cl. .......................................... 345/530; 345/23
(58) Field of Classification Search .................. None
   See application file for complete search history.

(56) References Cited

U.S. PATENT DOCUMENTS

| 5,954,650 | A  | * | 9/1999 | Saito et al. ..................... 600/425 |
| 7,034,791 | B1 | * | 4/2006 | Odom .............................. 345/98 |
| 2001/0050679 | A1 | * | 12/2001 | Shigeta .......................... 345/204 |
| 2001/0052902 | A1 | * | 12/2001 | Ono et al. ....................... 345/502 |
| 2004/0185878 | A1 | * | 9/2004 | Woo ................................ 455/457 |
| 2004/0214541 | A1 | * | 10/2004 | Choi ........................... 455/186.1 |

FOREIGN PATENT DOCUMENTS

| JP | 10-319942 | 12/1998 |
| JP | 11-024651 | 1/1999 |

* cited by examiner

*Primary Examiner* — Jacinta M Crawford (74) *Attorney, Agent, or Firm* — Fitzpatrick, Cella, Harper & Scinto (57) ABSTRACT

A display control system includes a division unit configured to divide a display screen into plural areas, a display unit configured to display data in each of the plural areas, and a setting unit configured to set any one of plural data transfer modes to each of the plural areas according to an instruction by a user, without changing a type of display data to be displayed in each of the plural areas. In addition, a transfer unit is configured to transfer, for each of the plural areas, display data to be displayed in the area in the data transfer mode set to the area by the setting unit. The display unit displays the display data transferred by the transfer unit in the area among the plural areas and corresponding to the type of display data.

6 Claims, 5 Drawing Sheets

| | |
|---|---|
| | END POINT0: CONTROL TRANSFER |
| (1) OPERATION INPUT DISPLAY SECTION | END POINT1: INTERRUPT TRANSFER |
| (2) IMAGE DISPLAY SECTION | END POINT2: BULK TRANSFER |
| (3) NUMERIC KEY DISPLAY SECTION | END POINT3: INTERRUPT TRANSFER |
| (4) SYSTEM STATE DISPLAY SECTION | END POINT4: INTERRUPT TRANSFER |
| (5) TOUCH KEY I/F UNIT | END POINT5: INTERRUPT TRANSFER |

DATA TRANSFER EXAMPLE

| 301 | 302 | 303 | 304 |
|---|---|---|---|
| | END POINT0: CONTROL TRANSFER | | |
| (1) OPERATION INPUT DISPLAY SECTION | END POINT1: INTERRUPT TRANSFER | (x1, y1), (x2, y2) | 0Xxxxxxx TO 0Xxxxxxx |
| (2) IMAGE DISPLAY SECTION | END POINT2: BULK TRANSFER | (x3, y3), (x4, y4) | 0Xxxxxxx TO 0Xxxxxxx |
| (3) NUMERIC KEY DISPLAY SECTION | END POINT3: INTERRUPT TRANSFER | (x5, y5), (x6, y6) | 0Xxxxxxx TO 0Xxxxxxx |
| (4) SYSTEM STATE DISPLAY SECTION | END POINT4: INTERRUPT TRANSFER | (x7, y7), (x8, y8) | 0Xxxxxxx TO 0Xxxxxxx |
| (5) TOUCH KEY I/F UNIT | END POINT5: INTERRUPT TRANSFER | | |

IMAGE PROCESSING DEVICE, CONTROL METHOD OF IMAGE PROCESSING DEVICE, AND STORAGE MEDIUM

BACKGROUND OF THE INVENTION

1. Field of the Invention

The present invention relates to an image processing device, a control method of the image processing device, and a storage medium for storing a program to execute the control method.

2. Description of the Related Art

Conventionally, as techniques for transmitting display image data to an operation display unit of an image processing device, following techniques have been proposed.

For example, Japanese Patent Application Laid-Open No. H10-319942 proposes a technique of providing on a display unit two memories corresponding to a whole display area of a display screen, and alternately changing over a display data reading source between the two memories to execute high-speed changeover of the display screen.

Further, Japanese Patent Application Laid-Open No. H11-024651 proposes a technique of reducing, in case of executing a rotation process to display data to be displayed on a display unit, a capacity of a memory by dividing the display data, reading each of the divided display data into the memory, and then executing the rotation process to each of the read display data.

However, in the above conventional techniques of the image processing device, in case of transferring the display data from the memory to the display unit, the image processing device transfers to the display unit the display data corresponding to the whole display area of the display unit. For this reason, an amount of the display data to be transferred to the display unit tends to increase.

SUMMARY OF THE INVENTION

The present invention provides an image processing device which overcomes such a conventional problem as described above, and a control method which is adopted by the image processing device.

The present invention aims at displaying display data at high speed without needlessly increasing, for example, a data transfer amount.

In addition, the present invention aims at dividing a display screen into plural areas, and thus optimizing data transfer to each of the divided areas.

Further features of the present invention will become apparent from the following description of exemplary embodiments with reference to the attached drawings.

BRIEF DESCRIPTION OF THE DRAWINGS

The accompanying drawings, which incorporate in and constitute a part of the specification, illustrate the exemplary embodiments of the present invention and, together with the description, serve to explain the principle of the present invention.

DESCRIPTION OF THE EMBODIMENTS

First Embodiment

Hereinafter, the first embodiment of the present invention will be described with reference to the attached drawings.

Figure 1:
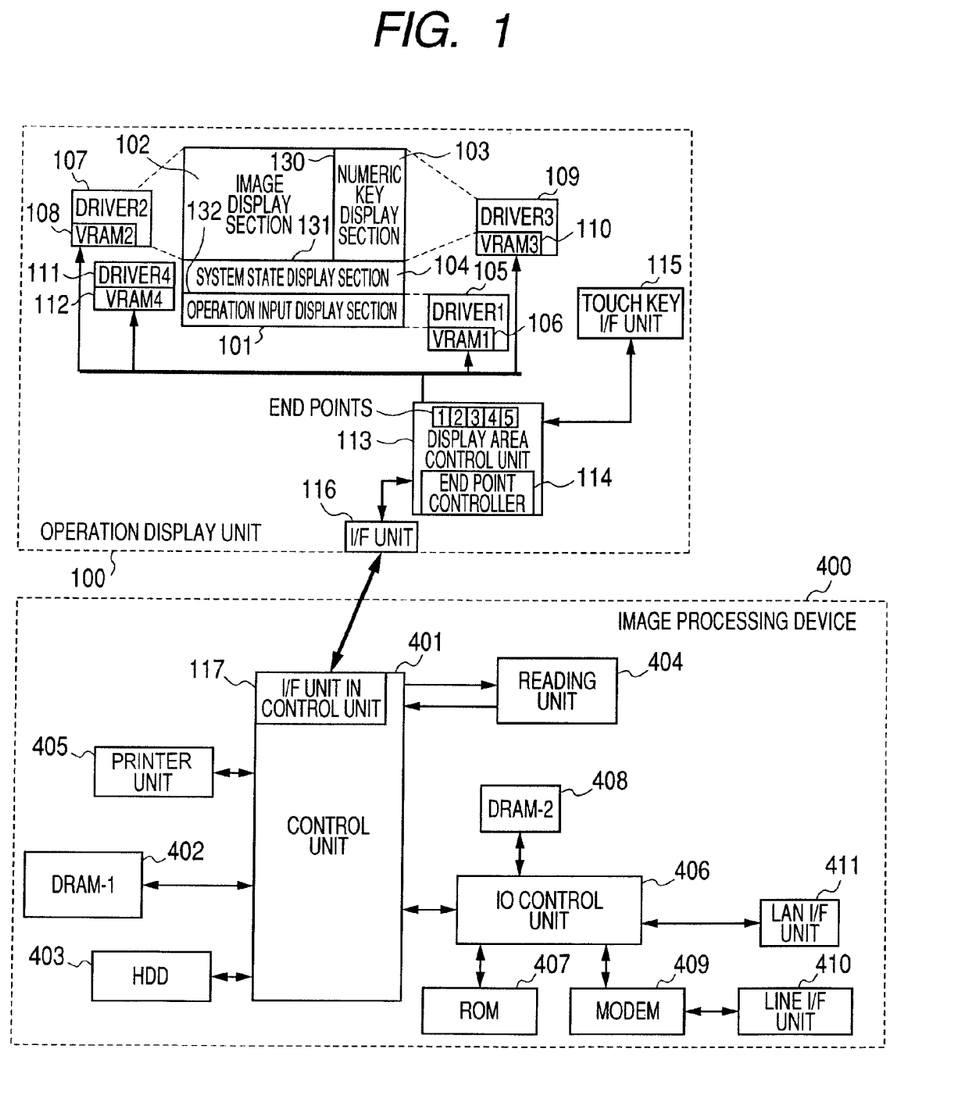
FIG. 1 is a block diagram illustrating an example of the constitution of an image processing device according to a first embodiment of the present invention.
Figure 6A:
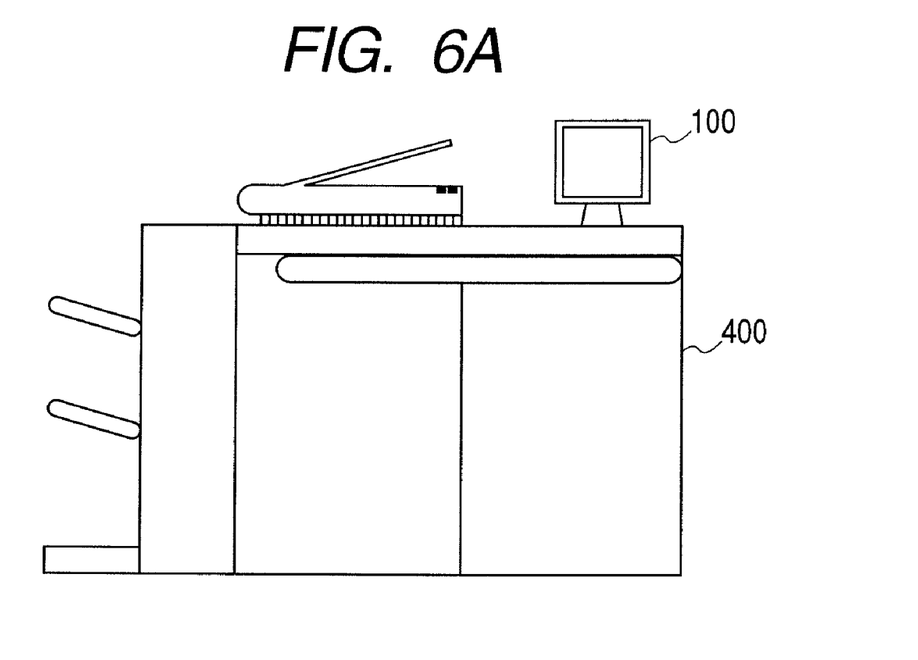
FIGS. 6A and 6B are diagrams illustrating overviews of this type of image processing device.
Figure 6B:
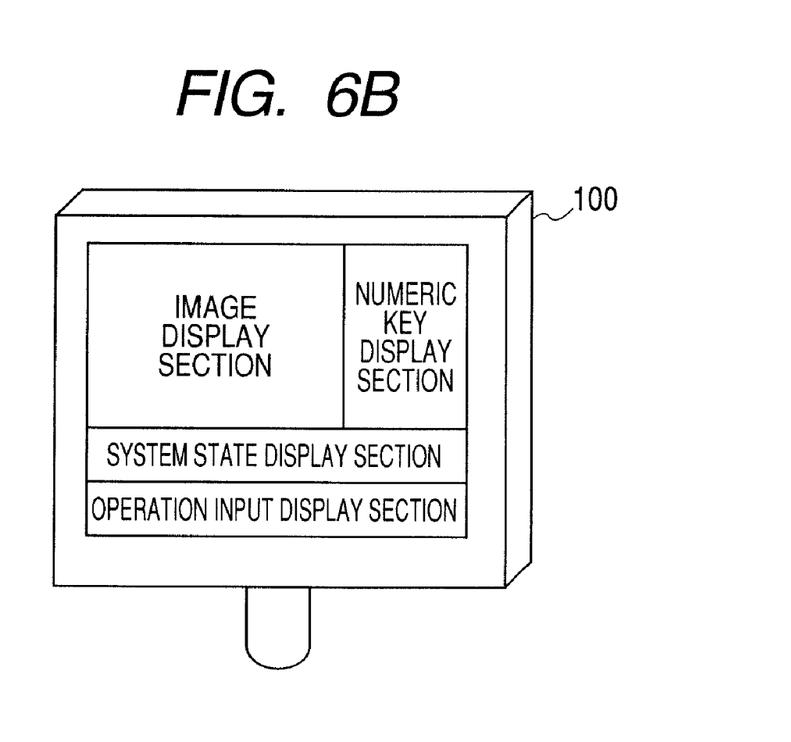

FIG. 1 is a block diagram illustrating an example of the constitution of an image processing device according to the first embodiment of the present invention, and FIGS. 6A and 6B are diagrams illustrating overviews of this type of image processing device. More specifically, FIG. 6A illustrates the entire the image processing device, and FIG. 6B enlargedly illustrates an operation display unit 100 in the image processing device.

In FIG. 1, an image processing device 400 includes a control unit 401 thereof. That is, the control unit 401 includes a not-illustrated CPU (central processing unit) to control the entire image processing device 400. A DRAM-1 (dynamic random access memory-1) 402 is used as a working area for execution of a control program by the control unit 401, a buffer for storing image data, and the like.

An HDD (hard disk drive) 403 stores therein the control program to be executed by the control unit 401, and various data including display data. The control unit 401 controls a reading unit 404, a printer unit 405 and an IO (input/output) control unit 406 by executing the program read from the HDD 403 on the DRAM-1 402. The IO control unit 406 transfers programs and data in a ROM (read only memory) 407 and data in a DRAM-2 408 to the control unit 401, and receives the data from the DRAM-1 402 and the HDD 403. Furthermore, the IO control unit 406 controls a modem 409 and drives a line I/F (interface) unit 410 to execute facsimile communication, and drives a LAN (local area network) I/F unit 411 to execute communication through a network.

Besides, in FIG. 1, the operation display unit 100 of the image processing device receives the display data transferred from the IO control unit 406 and executes display as illustrated in FIG. 6B. An operation input display section, an image display section, a numeric key display section and a system state display section which are illustrated in FIG. 6B respectively correspond to an operation input display section 101, an image display section 102, a numeric key display section 103 and a system state display section 104 which are illustrated in FIG. 1. Here, it should be noted that, in the following description, these display sections 101 to 104 are also called display areas 101 to 104 respectively. That is, the operation input display section 101, the image display section 102, the numeric key display section 103 and the system state display section 104 are equivalent to the plural display areas which are acquired by dividing the display screen on the operation display unit 100. More specifically, the operation input display section 101 is the display area for displaying an operation input screen, the image display section 102 is the display area for displaying at high speed an image read by the reading unit 404, or a still image or a moving image received through the LAN I/F unit 411, the numeric key display section 103 is the display area for displaying numeric keys and the like, and the system state display section 104 is the display area for displaying a system state of the image processing device. In addition, bars 130, 131 and 132 are displayed on the display screen on the operation display unit 100. Here, each of the bars 130, 131 and 132 indicates a boundary between the adjacent display areas. A user can move the desired bar up and down or right and left while selecting it. More specifically, the user can move the bar 130 right and left while selecting it, and can move each of the bars 131 and 132 up and down while selecting it. Thus, by properly moving the bar, it is possible to enlarge or reduce the size of the relevant display area.

A driver 1 105 drives the operation input display section 101, and a VRAM (video random access memory) 1 106 stores therein the display image data of the operation input display section 101. That is, the driver 1 105 displays the display image data stored in the VRAM 1 106 on the operation input display section 101.

A driver 2 107 drives the image display section 102, and a VRAM 2 108 stores therein the display image data of the image display section 102. That is, the driver 2 107 displays the display image data stored in the VRAM 2 108 on the image display section 102.

A driver 3 109 drives the numeric key display section 103, and a VRAM 3 110 stores therein the display image data of the numeric key display section 103. That is, the driver 3 109 displays the display image data stored in the VRAM 3 110 on the numeric key display section 103.

A driver 4 111 drives the system state display section 104, and a VRAM 4 112 stores therein the display image data of the system state display section 104. That is, the driver 4 111 displays the display image data stored in the VRAM 4 112 on the system state display section 104.

In conclusion, the driver 1 105, the driver 2 107, the driver 3 109 and the driver 4 111 respectively drive the divided plural display areas, that is, the operation input display section 101, the image display section 102, the numeric key display section 103 and the system state display section 104. Further, the VRAM 1 106, the VRAM 2 108, the VRAM 3 110 and the VRAM 4 112 respectively store the display data of the display areas respectively driven by the driver 1 105, the driver 2 107, the driver 3 109 and the driver 4 111

A display area control unit 113 controls display data to be transferred between the display area 101 to the display area 104 and the VRAM 1 106 to the VRAM 4 112, respectively. An end point controller 114 distributes data from an I/F unit 116 to end points respectively corresponding to the display areas 101 to 104, thereby achieving memory control.

A touch key I/F unit 115 transfers data input by user's operations to the display area control unit 113. An I/F unit 117, which is provided in the control unit 401 and connected to the I/F unit 116, executes data transfer between the control unit 401 and the operation display unit 100.

In the present embodiment, it is assumed that each of the I/F units 116 and 117 is a USB (Universal Serial Bus) terminal, but the present invention is not limited to this. That is, the operation display unit 100 and the main body of the image processing device 400 may be connected to each other through another type of interface.

Incidentally, not-illustrated end points 1 to 5 are provided in the display area control unit 113, and each of the end points 1 to 5 consists of an FIFO (first in, first out) buffer. The data transferred from the control unit 401 to the operation display unit 100 are sequentially stored in the corresponding end points (FIFO buffers) under the control of the end point controller 114. Then, the display area control unit 113 transfers the data stored in each end point to the corresponding driver or the like to control display of each display area.

When communication between the control unit 401 and the operation display unit 100 through the I/F units 117 and 116 starts, the control unit 401 sets addresses in the operation display unit 100 (that is, in the display area control unit 113). Here, it should be noted that a time when the communication starts is a point of time when the image processing device starts its operation or when the operation display unit 100 is connected to the I/F unit 117 in the control unit 401 and the control unit 401 recognizes the connected operation display unit 100. Subsequently, the control unit 401 requests and acquires information of the end points (FIG. 2) from the operation display unit 100.

The control unit 401 sets the information of each end point in the I/F unit 117. For example, the control unit 401 allocates the buffer corresponding to each end point to the corresponding buffer memory in the I/F unit 117. After then, the control unit 401 transfers the data to each end point in the operation display unit 100 by using the information of the end point (that is, through the corresponding buffer). In other words, the control unit 401 can independently transfer the display data to be displayed on each display area from the main body of the image processing device 400 to the operation display unit 100 through the I/F units 117 and 116 by using the end point of the corresponding display area. Further, the display area control unit 113 can independently receive and acquire the display data to be displayed on each display area from the main body of the image processing device 400 through the I/F units 117 and 116 by using the end point of the relevant display area.

Incidentally, FIG. 1 is directed to the constitution that the driver (including the VRAM) is provided with respect to each of the divided display areas, but the present invention is not limited to this That is, it is possible to use a single driver (including a single VRAM) capable of independently displaying the display data by independently driving each of the divided display areas 101 to 104. In such a constitution, the single VRAM can independently store the display data of each display area.

Hereinafter, the information of the end points to be transferred from the operation display unit 100 to the control unit 401 will be described with reference to FIG. 2.

Figure 2:
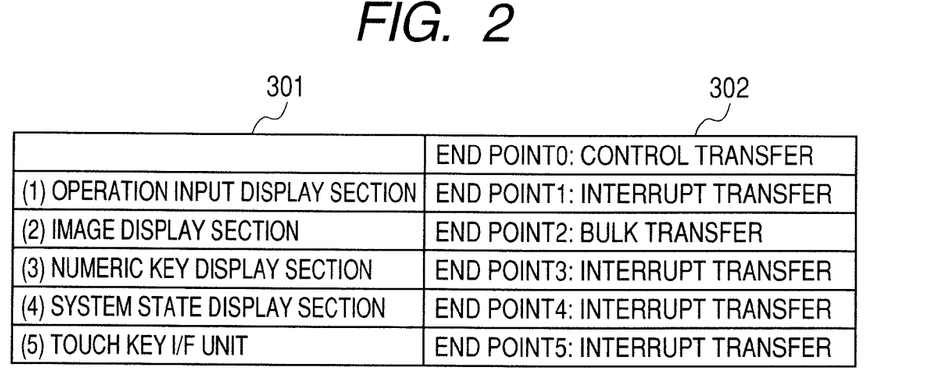
FIG. 2 is a schematic diagram illustrating information of end points respectively corresponding to display areas 101 to 104 of an operation display unit 100 illustrated in FIG. 1.

FIG. 2 is the schematic diagram illustrating the information of end points respectively corresponding to the display areas 101 to 104 of the operation display unit 100 illustrated in FIG. 1.

As illustrated in FIG. 2, the operation display unit 100 declares the end points respectively corresponding to the display areas 101 to 104. Then, as described above, the information of the end points is transferred (notified) from the end point controller 114 of the operation display unit 100 to the control unit 401 of the image processing unit 400 in response to the request from the control unit 401 to the operation display unit 100. Although it is not specifically illustrated, it is assumed that the information of the end points includes information of sizes of the respective end points (FIFO buffers) and the like.

In the present embodiment, as illustrated in FIG. 2, the end points 1 and 2 are respectively allocated to the operation input display section 101 and the image display section 102 by the operation display unit 100. Further, the end points 3, 4 and 5 are respectively allocated to the numeric key display section 103, the system state display section 104 and the touch key I/F unit 115 by the operation display unit 100.

Incidentally, the control unit 401 does not need to frequently change over the operation input display section 101, the numeric key display section 103, the system state display section 104 and the touch key I/F unit 115, based on the end point information received from the operation display unit 100. For this reason, the control unit 401 sets a transfer mode (transfer method, transfer system) to interrupt transfer (first transfer mode).

Further, since the image display section 102 is the display area which is possibly updated sequentially, the control unit 401 sets the transfer mode of the image display section 102 to bulk transfer (second transfer mode). Here, it should be noted that the images to be displayed in the image display section 102 include images read by the reading unit 404, images received from the LAN I/F unit 411, facsimile images input through the modem 409, moving images for operation instructions read from the HDD 403 and the ROM 407, and the like. Further, it should be noted that the data transfer speed in the bulk transfer (second transfer mode) is higher than that in the interrupt transfer (first transfer mode). For this reason, the bulk transfer is used to transfer the data to the display area to which data has to be transferred at high speed. Incidentally, it is assumed that the information of the end points illustrated in FIG. 2 has previously been set in the end point controller 114 by the operation display unit 100.

In the following, the data transfer operation by the image processing device 400 to the operation display unit 100 will be described.

In case of displaying or changing the image on the operation display unit 100, the control unit 401 first writes the data for each display area into the DRAM-1 402, and the IO control unit 406 transfers the written data for each display area from the DRAM-1 402 to the DRAM-2 408.

After then, the control unit 401 (or the IO control unit 406) further transfers the display image data from the DRAM-2 408 to the operation display unit 100 at certain intervals.

When the control unit 401 transfers the display image data to the operation display unit 100, the control unit 401 transfers the relevant display image data (that is, the data read from the DRAM-2 408) to the I/F unit 117 in the control unit 401. At that time, the control unit 401 designates, to the I/F unit 117, the end point corresponding to the display area on which the transferred image data is to be displayed (for example, the control unit 401 transfers the relevant image data to the buffer corresponding to the designated end point in the I/F unit 117). Incidentally, it is assumed that, if the size of the display image data is larger than the size of the corresponding end point, the relevant display image data is divided into data having the size of the end point, and then the divided display image data is transferred. In the present embodiment, the control unit 401 transfers the data read from the DRAM-2 408 to the I/F unit 117. However, the present invention is not limited to this. That is, the control unit 401 may transfer the data for each display area at certain intervals from the HDD 403 or the DRAM-1 402 without another memory.

Then, the I/F unit 117, which received the display image data from the control unit 401, designates the corresponding end point, and transfers the received display image data to the I/F unit 116 in the transfer mode corresponding to the designated end point.

Subsequently, the I/F unit 116, which received the display image data transferred from the I/F unit 117 in the control unit 401, designates the end point designated by the I/F unit 117, and transfers the received display image data to the end point controller 114. The end point controller 114, which received the display image data from the I/F unit 116, distributes the received display image data to the designated end point (FIFO buffer). Further, the display area control unit 113 transfers the data stored in each end point (FIFO buffer) to the corresponding VRAM or the like through the corresponding driver. That is, the display area control unit 113 (including the end point controller 114) controls to transfer the display image data received for each display area from the I/F unit 116 to the corresponding VRAM with respect to each display area. Then, each driver independently displays the display image data stored in the corresponding VRAM on the corresponding display area.

For example, if data (1) is stored in the end point 1, the display area control unit 113 transfers the data (1) stored in the end point 1 to the VRAM 1 106 through the driver 1 105. Likewise, if data (2) is stored in the end point 2, the display area control unit 113 transfers the data (2) stored in the end point 2 to the VRAM 2 108 through the driver 2 107. Further, if data (3) is stored in the end point 3, the display area control unit 113 transfers the data (3) stored in the end point 3 to the VRAM 3 110 through the driver 3 109. Furthermore, if data (4) is stored in the end point 4, the display area control unit 113 transfers the data (4) stored in the end point 4 to the VRAM 4 112 through the driver 4 111. Furthermore, if data (5) is stored in the end point 5, the display area control unit 113 transfers the data (5) stored in the end point 5 to the touch key I/F unit 115.

Besides, the driver 1 105 to the driver 4 111 respectively drive the display image data in the VRAM 1 106 to the image display data in the VRAM 4 112, and respectively update the display areas 101 to 104 independently. More specifically, the driver 1 105 controls to update the display on the operation input display section 101 based on the display data in the VRAM 1 106, the driver 2 107 controls to update the display on the image display section 102 based on the display data in the VRAM 2 108, the driver 3 109 controls to update the display on the numeric key display section 103 based on the display data in the VRAM 3 110, and the driver 4 111 controls to update the display on the system state display section 104 based on the display data in the VRAM 4 112.

Hereinafter, an example of transfer of the display image data will be described with reference to FIG. 3.

Figure 3:
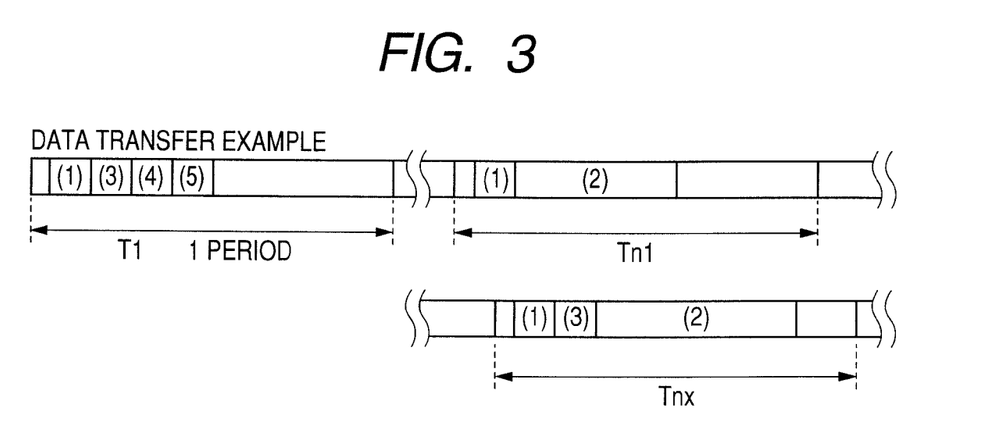
FIG. 3 is a schematic diagram illustrating an example of transfer of display image data in the first embodiment.

That is, FIG. 3 is the schematic diagram illustrating the example of transfer of the display image data in the present embodiment.

In FIG. 3, data (1) to (5) respectively correspond to the end points 1 to 5, and T1 is equivalent to one period. In the period T1, there is no image update on the image display section 102. That is, in the period T1, the data (1), (3), (4) and (5) corresponding to the interrupt transfer are transferred.

In such data transfer, the control unit 401 transfers the display image data read from the HDD 403 to the I/F unit 117 in the control unit 401. The transferred data is further transferred from the I/F unit 117 to the I/F unit 116 in the operation display unit 100. Then, the transferred data is further transferred to the end point controller 114, and distributed to the corresponding end point as the data for the relevant end point.

Subsequently, the display area control unit 113 transfers the data (1) stored in the end point 1 to the VRAM 1 106 through the driver 1 105, the display area control unit 113 transfers the data (3) stored in the end point 3 to the VRAM 3 110 through the driver 3 109, the display area control unit 113 transfers the data (4) stored in the end point 4 to the VRAM 4 112 through the driver 4 111, and the display area control unit 113 transfers the data (5) stored in the end point 5 to the touch key I/F unit 115.

Besides, the drivers of the respective display areas drive the display image data in the respective VRAM's, and update the respective display areas. More specifically, the driver 1 105 controls to update the display on the operation input display section 101 based on the data (1) in the VRAM 1 106, the driver 3 109 controls to update the display on the numeric key display section 103 based on the data (3) in the VRAM 3 110, and the driver 4 111 controls to update the display on the system state display section 104 based on the data (4) in the VRAM 4 112.

Moreover, in a period Tn1 of FIG. 3, the interrupt transfer of the data (1) and the bulk transfer of the data (2) to the image display section 102 overlap each other.

The data (1) is transferred in the same manner as that in the period T1. In addition, the control unit 401 likewise transfers the update data (2) for the image display section 102 from the HDD 403 to the I/F unit 117 in the control unit 401. Then, the data (2) is transferred from the I/F unit 117 to the I/F unit 116 in the operation display unit 100, and further transferred therefrom to the end point controller 114. Subsequently, the transferred data (2) is stored in the end point 2.

The display area control unit 113 transfers the data (2) stored in the end point 2 to the VRAM 2 108 through the driver 2 107.

Further, the driver 2 107 controls to drive the display image data in the VRAM 2 108 so as to update the image display section 102.

Moreover, in a period Tnx of FIG. 3, the interrupt transfer of the data (1) and (3) and the bulk transfer of the data (2) to the image display section 102 overlap each other. Here, it should be noted that the data transfer method in the period Tnx is the same as that in the period Tn1.

As described above, according to the present embodiment, since the display area is divided into the plural areas and the transfer method to each of the divided areas is optimized, it is possible to reduce an amount of data transfer between the control unit 401 and the operation display unit 100.

That is, the control unit 401 of the image processing device does not transfer the data of all the display areas to the operation display unit 100 but can transfer only the data to be displayed in the necessary display area from the control unit 401 to the operation display unit 100 at necessary timing. Accordingly, it is possible to transfer at high speed the image data to the area (high-speed display area) such as the image display section 102 that it is necessary to sequentially update the images.

As a result, it is possible to reduce the power consumption in memories and the like, and, at the same time, it is possible to achieve high-speed display, whereby it is possible to increase user's operability and convenience.

Incidentally, in the present embodiment, the control unit 401 automatically determines the transfer mode corresponding to each of the display areas 101 to 104 according to the end point information previously set in the end point controller 114.

However, the present invention is not limited to this. That is, the control unit 401 may determine the transfer mode corresponding to each of the display areas 101 to 104 based on user's setting. For example, if a transfer mode setting request is received from a user, the control unit 401 causes the operation display unit 100 to display the plural display areas 101 to 104 respectively determined based on the end point information. Then, the control unit 401 causes the operation display unit 100 to display selectable candidates for enabling the user to select any one of the plural transfer modes in relationship to the respective display areas 101 to 104. Subsequently, if the transfer mode is selected for each of the display areas 101 to 104 by the user, the control unit 401 stores the selected transfer modes in relationship to the respective display areas. For example, if the user selects the display area 101 and sets the interrupt transfer for the selected display area 101, the control unit 401 stores the information indicating the interrupt transfer in relationship to the display area 101. After then, the control unit 401 transfers the display image data in the mode set by the user with respect to each display area.

Thus, since the control unit 401 determines the transfer mode for each of the display areas based on the user's setting, the user can transfer the display image data in the desired mode with respect to each of the display areas displayed on the operation display unit 100.

Second Embodiment

Hereinafter, the second embodiment of the present invention will be described with reference to FIG. 4.

Figure 4:
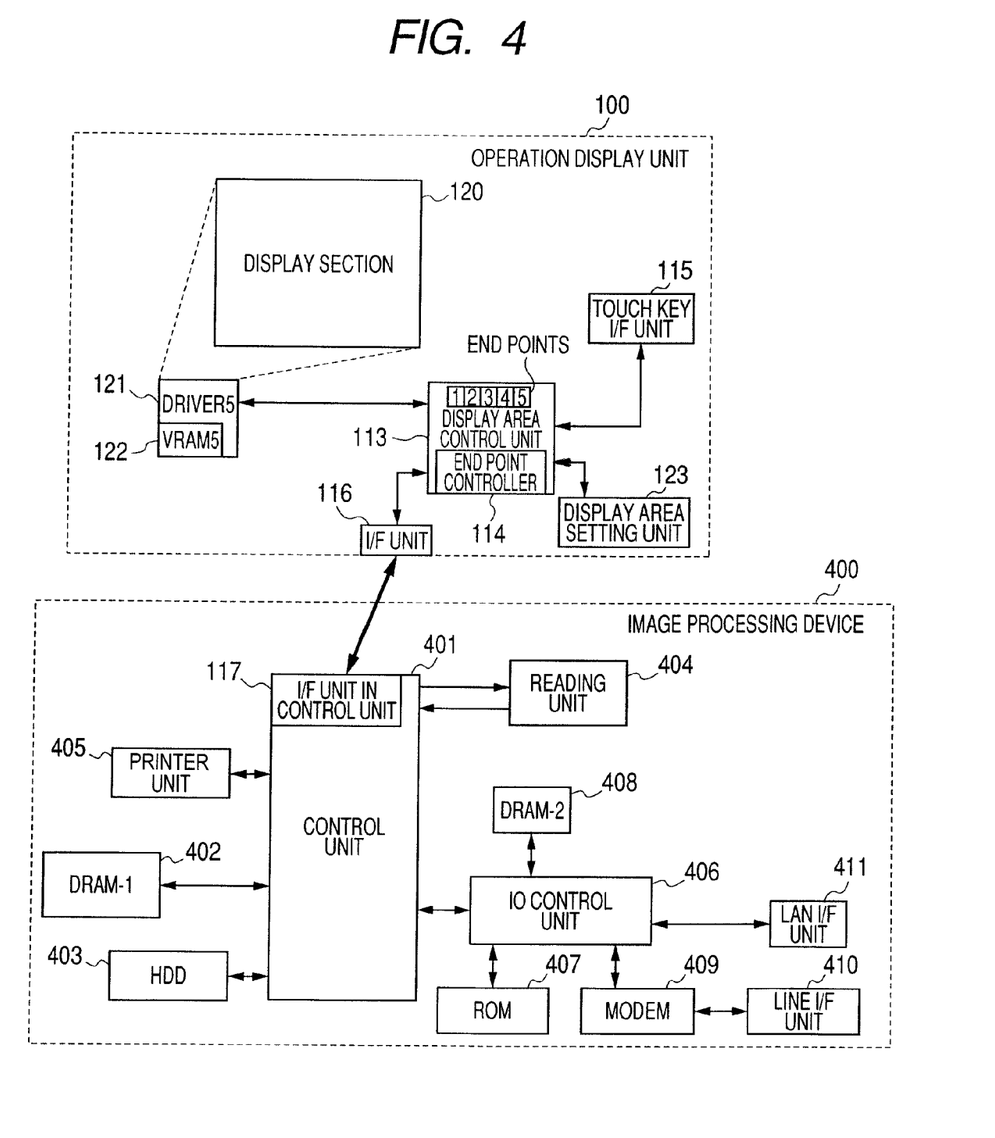
FIG. 4 is a block diagram illustrating an example of the constitution of an image processing device according to a second embodiment of the present invention.

FIG. 4 is a block diagram illustrating an example of the constitution of an image processing device according to the second embodiment of the present invention. In FIG. 4, the same constituent components as those illustrated in FIG. 1 are denoted by the same reference numerals as those illustrated in FIG. 1, respectively.

In FIG. 4, a display section 120 corresponds to display areas of an operation display unit 100. Further, a driver 5 121 drives the display section 120 to display various data, and a VRAM 5 122 stores therein the data to be displayed on the display section 120.

Figure 5:
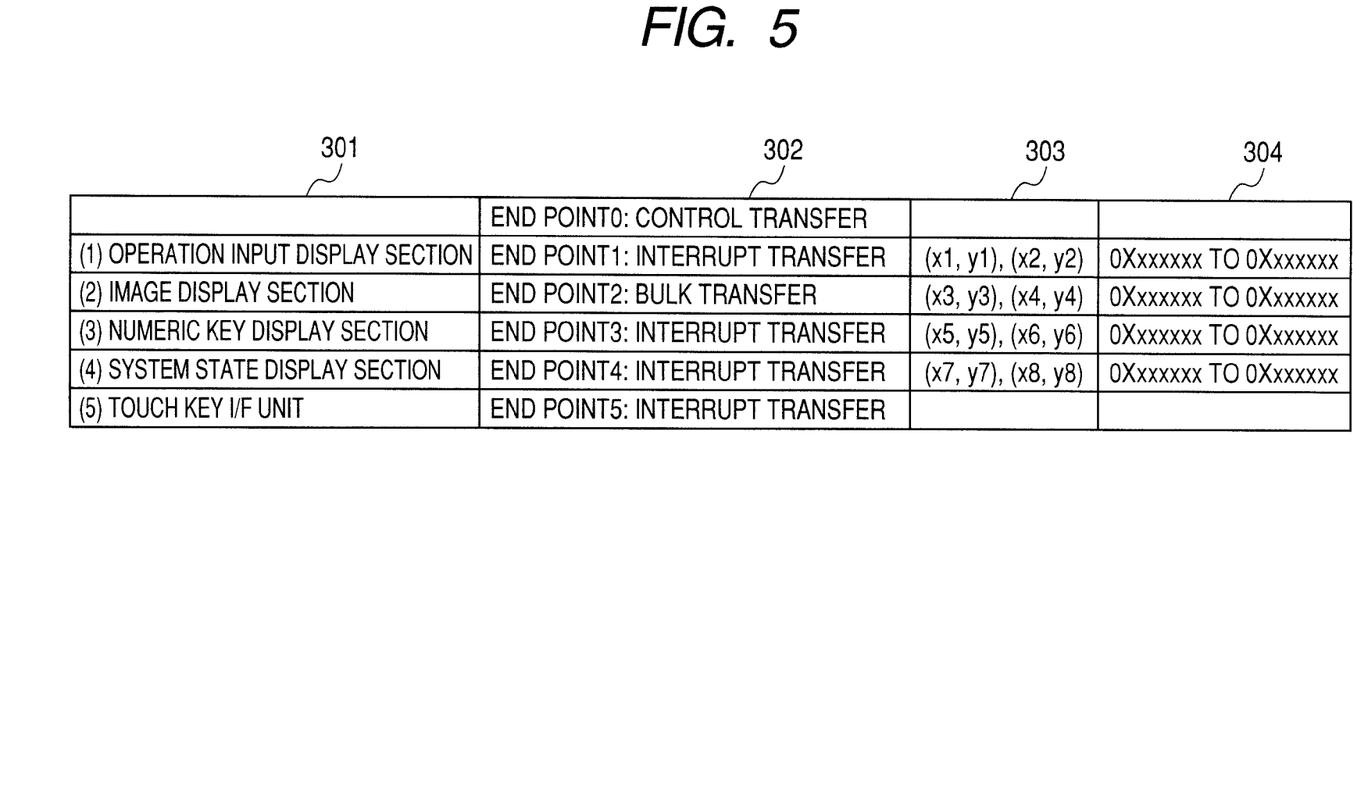
FIG. 5 is a schematic diagram illustrating setting values set and stored in a display area setting unit 123.

A display area setting unit 123 first calculates memory areas in the VRAM 5 122 based on the setting values of the display areas designated by the user, and then stores therein the calculated memory areas. More specifically, the display area setting unit 123 associates the plural display areas designated by the user on the operation display unit 100 with the memory areas in the VRAM 5 122, and then sets the respective associated values. Incidentally, FIG. 5 is a schematic diagram illustrating the setting values set and stored by the display area setting unit 123.

Hereinafter, a setting operation will be described.

The setting value of the display area input by the user through a touch key I/F unit 115 is received by a control unit 401 through an I/F unit 116 and an I/F unit 117 in the control unit 401. Then, the control unit 401 transfers the setting value of the display area to the I/F unit 116 through the I/F unit 117 in response to such reception (here, control transfer using an end point 0 is used). Subsequently, the setting value of the display area is transferred to the display area setting unit 123 through an end point controller 114 and a display area control unit 113 (303 in FIG. 5).

Incidentally, the setting value for each display area is configured by rectangular coordinates (upper left coordinates, lower right coordinates) on the display section 120 to which the user executes touch input through the touch key I/F unit 115 of the operation display unit 100. For example, the rectangular coordinates of an operation input display section is [(x1, y1), (x2, y2)], the rectangular coordinates of an image display section is [(x3, y3), (x4, y4)], the rectangular coordinates of a numeric key display section is [(x5, y5), (x6, y6)], and the rectangular coordinates of a system state display section is [(x7, y7), (x8, y8)]. Here, it is possible to touch-input the rectangular coordinates from the touch key I/F unit 115 of the operation display unit 100. However, it is also possible to directly input the values of the rectangular coordinates from a numeric key screen or the like.

Then, the display area setting unit 123 calculates and stores the memory areas (that is, ranges of addresses) of the VRAM 5 122 (hereinafter, called area setting values) corresponding to the respective display areas (in this case, the memory areas and the addresses are mutually associated as indicated by 303 and 304 in FIG. 5). Then, the display area setting unit 123 transfers the area setting value of each display area to the end point controller 114.

The end point controller 114 determines, from the area setting values of the respective display areas received from the display area setting unit 123, the end point corresponding to the area setting value of each display area and the transfer mode. Then, the end point controller 114 stores the area setting value, the end point and the transfer mode in the display area setting unit 123 (FIG. 5).

Subsequently, the display area control unit 113 controls to disconnect the I/F unit 116 from the I/F unit 117 in the control unit 401. After then, the display area control unit 113 controls to restore the connection between the I/F unit 116 and the I/F unit 117 in the control unit 401.

The control unit 401 detects such restoration of the connection between the I/F unit 116 and the I/F unit 117, and sets the addresses in the display area control unit 113 through the I/F unit 116. Subsequently, the control unit 401 requests configuration information (i.e., information of the end points (the end points corresponding to the respective display areas, the transfer modes, sizes of the end points, etc.): 301 and 302 in FIG. 5).

The display area control unit 113 transfers, in response to this request, the setting value (i.e., the information of the end point) stored in the display area setting unit 123 to the control unit 401 through the I/F unit 116 and the I/F unit 117 in the control unit 401.

Then, the control unit 401 sets the information of each end point in the I/F unit 117 (for example, the control unit 401 allocates the buffer corresponding to each end point to the corresponding buffer memory in the I/F unit 117). After then, the control unit 401 transfers the data to each end point in the operation display unit 100 by using the information of the end point (that is, through the corresponding buffer).

In other words, the control unit 401 can independently transfer the display data to be displayed on each display area from the main body of an image processing device 400 to the operation display unit 100 through the I/F units 117 and 116 by using the end point of the corresponding display area. Further, the display area control unit 113 can independently receive and acquire the display data to be displayed on each display area from the main body of the image processing device 400 through the I/F units 117 and 116 by using the end point of the relevant display area.

In the following, the data transfer operation will be described.

When the control unit 401 transfers the display image data to the operation display unit 100, the control unit 401 transfers the relevant display image data to the I/F unit 117 in the control unit 401. At that time, the control unit 401 designates, to the I/F unit 117, the end point corresponding to the display area on which the transferred image data is to be displayed (for example, the control unit 401 transfers the relevant image data to the buffer corresponding to the designated end point in the I/F unit 117). Incidentally, it is assumed that, if the size of the display image data is larger than the size of the corresponding end point, the relevant display image data is divided into data having the size of the end point, and then the divided display image data is transferred.

Then, the I/F unit 117, which received the display image data from the control unit 401, designates the corresponding end point, and transfers the received display image data to the I/F unit 116 in the transfer mode corresponding to the designated end point.

Subsequently, the I/F unit 116, which received the display image data transferred from the I/F unit 117 in the control unit 401, designates the end point designated by the I/F unit 117, and transfers the received display image data to the end point controller 114. The end point controller 114, which received the display image data from the I/F unit 116, distributes the received display image data to the designated end point.

Further, the display area control unit 113 transfers the data stored in each end point to the corresponding memory area in the VRAM 5 122, based on the area setting value (304 in FIG. 5) stored in the display area setting unit 123. That is, the display area control unit 113 (including the end point controller 114) controls to transfer the display image data received for each display area from the I/F unit 116 to the memory area of the corresponding display area in the VRAM 5 122 associated by the display area setting unit 123. Then, the driver 5 121 displays the display image data stored in the VRAM 5 122 on the display section 120.

For example, if data (1) is stored in the end point 1, the display area control unit 113 transfers the data (1) stored in the end point 1 to the memory area in the VRAM 5 122 corresponding to the end point 1, based on the area setting value of the display area stored in the display area setting unit 123.

Further, the driver 5 121 controls to drive the display image data in the VRAM 5 122 so as to update the image display section 102.

As described above, the control unit 401 can transfer and display the image data with respect to each set display area on the operation display unit 100.

Incidentally, in the present embodiment, the user determines the display area on the operation display unit 100 by inputting the rectangular coordinates (upper left coordinates, lower right coordinates) through the touch key I/F unit 115. However, the present invention is not limited to this. That is, the user can also determine the display area on the operation display unit 100 by sliding up/down and right/left a bar between the adjacent display areas from among the plural divided display areas. Alternatively, the user can also determine the display area on the operation display unit 100 by sliding a screen displayed in a pop-up manner on a part of the screen of the operation display unit 100 under the state being selected by the touch key I/F unit 115.

Moreover, in the present embodiment, the control unit 401 automatically determines the transfer mode of each display area based on the area setting value of the relevant display area received from the display area control unit 113.

However, the control unit 401 may determine the transfer mode corresponding to each display area determined in the above-described manner, based on user's setting executed through the touch key I/F unit 115. For example, if a request for setting the transfer mode is received from the user, the control unit 401 causes the operation display unit 100 to display the plural display areas respectively determined based on information of the end points. Further, the control unit 401 causes the operation display unit 100 to display selectable candidates for enabling the user to select any one of the plural transfer modes in relationship to the respective display areas. Then, if the transfer modes are selected by the user with respect to the respective display areas, the control unit 401 stores the selected transfer modes in relationship to the respective display areas. For example, if one display area is selected by the user and the interrupt transfer is set with respect to the selected display area, the control unit 401 stores the information indicating the interrupt transfer in relationship to the selected display area. After then, the control unit 401 transfers display data in the transfer mode set by the user, with respect to each display area.

Thus, since the control unit 401 determines based on the user's setting the transfer mode with respect to each display area, the user can transfer the image data in the desired transfer mode with respect to each display area displayed by the operation display unit 100.

As just described, according to the present embodiment, since the transfer method to each of the display areas set by the user is optimized, it is possible to reduce an amount of data transfer between the control unit 401 and the operation display unit 100

That is, the control unit 401 of the image processing device does not transfer the data of all the display areas to the operation display unit 100 but can transfer only the data to be displayed in the necessary display area from the control unit 401 to the operation display unit 100 at necessary timing. Accordingly, it is possible to transfer at high speed the image data to the area (high-speed display area) such as an image display section that it is necessary to sequentially update the images.

As a result, it is possible to reduce the power consumption in the control unit 401, a memory and the like, and, at the same time, it is possible to achieve high-speed display, whereby it is possible to increase user's operability and convenience.

Incidentally, it should be noted that the configurations of the above-described various data and the contents thereof are not limited to them. That is, it is a matter of course that the present invention can adopt various kinds of configurations and contents according to purposes and applications.

As described above, the present invention can be applied as, for example, a system, a device, an apparatus, a method, a program, a storage medium or the like. More specifically, the present invention can be applied to a system constituted by plural devices, or to a stand-alone device.

Furthermore, it is a matter of course that the present invention can be applied to a case where the functions of the above-described embodiments are achieved by supplying a program to a system or a device In this case, the program represented by software for achieving the functions of the above-described embodiments is read from a storage medium to the system or the device, whereby the system or the device can enjoy the effects of the present invention.

While the present invention has been described with reference to what are presently considered to be the exemplary embodiments, the invention is not limited to the disclosed embodiments. On the contrary, the invention is intended to cover various modifications (including an organic combination of the respective embodiments) included within the spirit and scope of the appended claims. The scope of the following claims is to be accorded the broadest interpretation so as to encompass all such modifications and equivalent structures and functions.

Although the exemplary embodiments have been explained by way of various examples, it is apparent for one of ordinary skill in the art that the purpose and the scope of the present invention are not limited to the specific explanations described in the present application.

Incidentally, the present invention is not limited to the above-described embodiments. That is, various modifications are of course possible within the range not departing from the scope of the present invention.

As just described, according to the present invention, since the display area is divided into the plural areas and the transfer method to each of the divided areas is optimized, it is possible to reduce an amount of data transfer between the control unit of the main body of the image processing device and the operation display unit. That is, the control unit of the image processing device can process the image data in the high-speed display area and preferentially transfer the display image data in the high-speed display section.

As a result, it is possible to reduce the power consumption in the memories and the like, and, at the same time, it is possible to achieve high-speed display, whereby it is possible to increase user's operability and convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-334238, filed Dec. 12, 2006, which is hereby incorporated by reference herein in its entirety.

What is claimed is:

1. A display control system comprising:
   a display unit having a display screen;
   a division unit configured to divide the display screen into first and second areas;
   a setting unit configured to set a bulk transfer mode to the first area in which an image is displayed, and to set an interrupt transfer mode to the second area in which an image is not displayed; and
   a transfer unit configured to transfer first data indicating an image in the bulk transfer mode and to transfer second data which does not indicate an image in the interrupt transfer mode, wherein
   the display unit is configured to display the first data in the first area and to display the second data in the second area.

2. A display control system according to claim 1, wherein the display screen is divided into a plurality of areas according to a predetermined instruction from the user.

3. A display control system according to claim 1, wherein the transfer unit transfers the first and second data to the display unit independently with respect to each area, according to the transfer mode previously determined with respect to each area.

4. A display control system according to claim 1, wherein the first data is transferred at a higher speed than the second data.

5. A control method for a display control system, comprising:
   dividing a display screen into first and second areas;
   setting a bulk transfer mode to the first area in which an image is displayed;
   setting an interrupt transfer mode to the second area in which an image is not displayed;
   transferring first data indicating an image in the bulk transfer mode;
   transferring second data which does not indicate an image in the interrupt transfer mode, and
   displaying the first data in the first area and displaying the second data in the second area.

6. A non-transitory storage medium which stores a program for causing a computer of a display control system to execute a control method for the display control system, the control method comprising:
   dividing a display screen into first and second areas;
   setting a bulk transfer mode to the first area in which an image is displayed;
   setting an interrupt transfer mode to the second area in which an image is not displayed;

transferring first data indicating an image in the bulk transfer mode;
transferring second data which does not indicate an image in the interrupt transfer mode; and
displaying the first data in the first area and displaying the second data in the second area.

* * * * *